Patented May 9, 1950

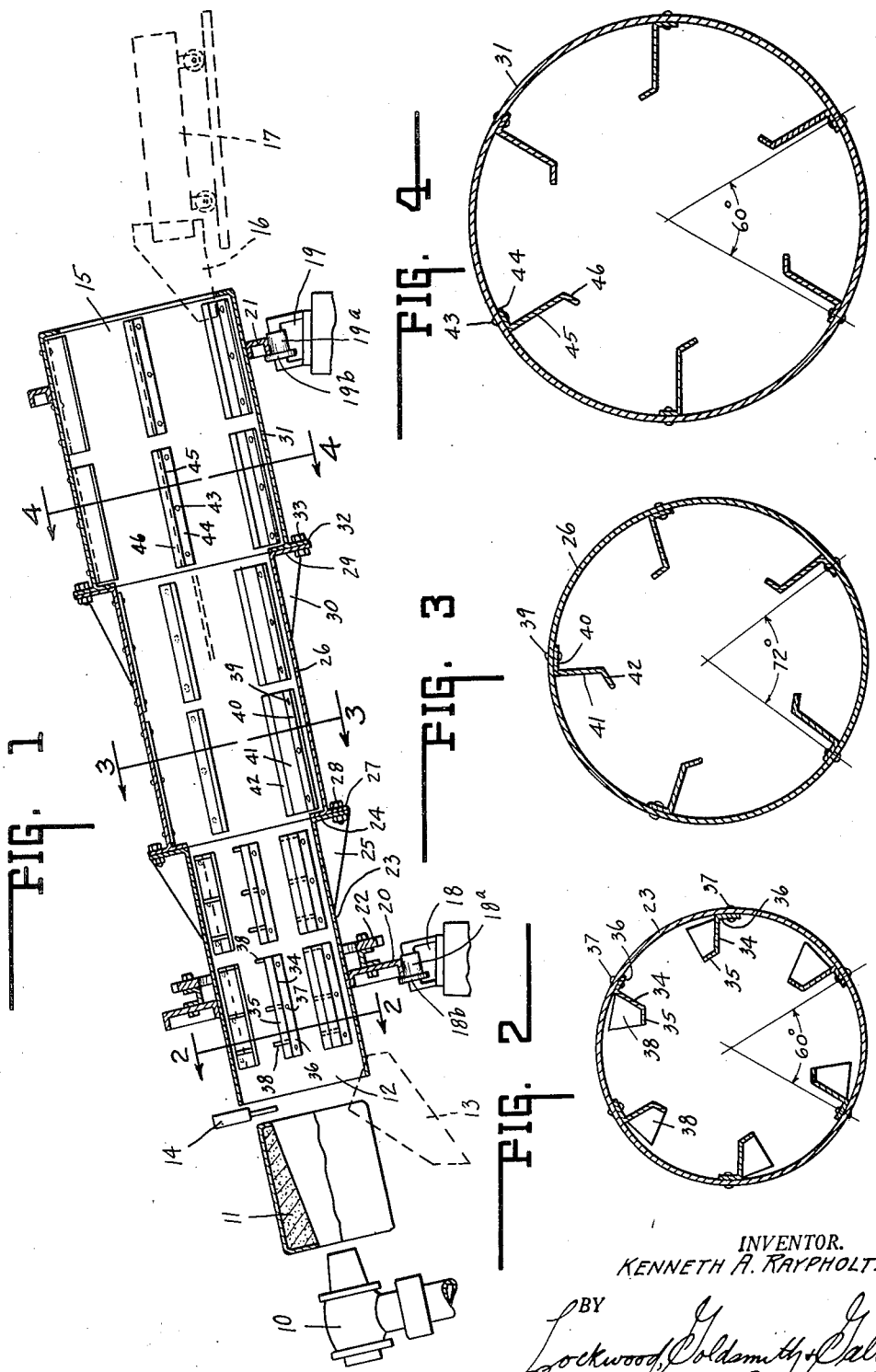

2,506,739

UNITED STATES PATENT OFFICE 2,506,739

INCLINED DRIER

Kenneth A. Raypholtz, Marion, Ind., assignor to Overmander Machine, Inc., Marion, Ind., a corporation Application June 19, 1946, Serial No. 677,840

1 Claim. (Cl. 259—3)

This invention relates to an inclined drier for aggregate and the like, which drier receives the aggregate at the upper and larger end and discharges the dried aggregate at the lower and smaller end.

Herein there is aligned with the lower or discharge end, a burner structure with discharges into the said lower end (counterflow type) products of combustion. The gas discharge is at the upper end so that the progressively heated aggregate is subjected to progressively greater temperatures, the hottest being at the drier discharge end.

The chief object of the present invention is to pass the aggregate through products of combustion as the latter ascend (axially) the drier.

The chief feature of the invention resides in the peripherally arranged aggregate moving baffles or vanes, same comprising a plurality of angularly offset series thereof, as more fully set forth hereinafter.

A second feature resides in sectionalizing both the drum and the vanes interiorly secured thereto so that replacement, etc., may readily be effected.

Other objects and features of the invention will be set forth more fully hereinafter.

The full nature of the invention will be understood from the accompanying drawings and the following description and claim.

In the drawings:

Fig. 1 is a central sectional view through an embodiment of the invention, the burner associated therewith being shown in elevation, except for a sectioned portion, and dotted lines indicating an aggregate supply means.

Fig. 2 is a vertical transverse sectional view of the small end section of the drier and is taken on line 2—2 of Fig. 1 and in the direction of the arrows.

Fig. 3 is a similar view of the intermediate section and is taken on line 3—3 of Fig. 1 and in the direction of the arrows.

Fig. 4 is a similar view of the largest section and is taken on line 4—4 of Fig. 1 and in the direction of the arrows.

In Fig. 1 of the drawing there is illustrated an inclined, tubular aggregate and like drier drum structure. Aligned therewith is a burner unit 10 of gas or oil type discharging into a refractory ignition tile 11, the latter discharging the products of combustion (hot gases) into the discharge and lower end 12 of the drier.

Associated therewith is a discharge chute 13, if desired, and positioned between the tile and drum is an ignition unit 14. The tile, chute and ignition device is fully disclosed and claimed in the copending application, Serial No. 674,423, filed June 5, 1946, and entitled Aggregate drier.

Also as shown therein and herein the intake end 15 of the drum is supplied with aggregate by any suitable means such a chute 16 supplied by suitable means such as a cart 17, the latter being fully disclosed in copending application Serial No. 655,764, filed March 20, 1946, and entitled Continuous volumetric control apparatus.

The latter, that is, the supply, forms no part of this invention, neither does the movable igniter 14, its control and operation, but same is herein disclosed to complete the disclosure of a drying system which includes the drier drum, the subject matter of this invention.

As similarly disclosed in the first mentioned application there is provided two arcuate cradles 18 and 19 that include rollers 18a and 19a with lower flanges 18b and 19b respectively. Rotatably supported by these cradles are the rings 20 and 21, respectively. Carried by lower and larger ring 20 is a sprocket 22 by which the drier drum is rotated.

The following description is directed to the invention herein claimed. The drier drum is sectionalized and includes smaller and lower end section 23 with discharge end 12 aforesaid and outwardly directed upper end flange 24 reenforced by a suitable number of ribs 25.

The intermediate section includes tubular portion 26 with outwardly directed flange 27 for connection as by bolts and nuts 28 to flange 24. Tube 26 includes at its opposite upper end outwardly directed flange 29 reenforced by external ribs 30.

The upper and larger section includes tubular portion 31 with lower outwardly directed flange 32 connected to flange 29 by bolts and nuts 33. The upper intake end 15 of the drier is formed by an inwardly directed flange as shown.

The resulting structure is of sectionalized character and may be externally insulated in any desired manner, one such arrangement being disclosed in the first mentioned copending application. Sectionalizing facilitates erection, repair and replacement.

In the lower section there is secured two parallel annular series of arcuately spaced vanes or baffles 34 having forward or advanced lips 35 and oppositely directed base flanges 36 by which same are suitably secured as by rivets 37, to the drum 23 interior.

Each vane of each annular series includes a plurality of transverse dams 38. The vanes of the two series are longitudinally aligned and slightly spaced apart and slightly spaced from the opposite ends of tube 23.

The intermediate tube 27 has secured to its interior, as by rivets 39, the bases 40 of vanes or baffles 41 having lips 42. There are two parallel annular series of such baffles angularly spaced apart. The baffles in the two series are longitudinally aligned and slightly spaced apart and slightly spaced from the ends of tube 26.

In like manner there is secured to the interior of tube 31, as by rivets 43, the base portions 44 of baffles 45 having lips 46. These baffles are arranged in two parallel annular series, with baffles angularly spaced apart and longitudinally aligned as aforesaid. The two series are slightly spaced apart and their remote ends are slightly spaced from the ends of tube 31.

As shown by a comparison of Figs. 2 to 4 inclusive the baffles of the upper and intermediate section, if desired, are devoid of dams, such as indicated at 38 in Figs. 1 and 2, provided upon the lower section baffles.

Also as shown by the three figures the number of vanes in the several sections varies and same are offset. Thus the upper section includes twelve vanes 45 in two groups, spaced apart 60°.

The intermediate section includes ten vanes 41, in two groups, spaced apart 72° and arcuately offset relative to vanes 45. The lower section includes twelve vanes 34, in two groups, spaced apart 60° and arcuately offset relative to vanes 45. Herein vanes 34 and 45 happen to be longitudinally aligned but this is not necessary. Neither is it necessary that the number of vanes in the adjacent sections differ for offsetting will be equally satisfactory.

It will be obvious that aggregate supplied at end 15 will be picked up by vanes or baffles 45 in the counter-clockwise rotation of the drum, see Fig. 4, and carried upwardly therein until it reaches the two o'clock position. From that position to the eleven o'clock position the elevated aggregate discharges downwardly to the lower side of the section, sliding longitudinally and downwardly therein.

The products of combustion thus pass through the curtain of falling aggregate for most efficient drying of same. Since the baffles in successive sections are angularly offset, the aggregate does not slide from one end to the other of the drum without elevation but is broken up in its gravitational travel along the drum interior from end to end thereof.

Furthermore, the several dams 38 also interrupt such linear travel tendency and thus insure retarded travel of the aggregate through the drum sufficient to properly dry same.

In view of the aggregate curtain effect and combustion gas discharge as at intake 15, a muffle may be applied to this end to reduce dust nuisance to a minimum. Such muffle addition, being illustrated in the first mentioned copending application, is omitted herefrom.

The inclination of the drum rotational axis must exceed that necessary to position the lower peripheral portions of drums 23 and 31 at their outer ends in a horizontal plane, otherwise gravitational travel from end to end of the drum will be retarded to such an extent that clogging may well occur in the drum. An inclination of from ten to twenty degrees is satisfactory and about twelve is adequate. An excessive inclination obviously will result in too rapid travel of the aggregate through the drum and diminution of the curtain effect for most efficient drying.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

In a rotatable elongated tubular aggregate drier having its axis inclined to the horizontal and its intake at the upper end and its discharge at the lower end, the latter being arranged to receive a drying flame and the former being arranged to discharge products of combustion therefrom, the combination of at least a plurality of successively and detachably connected drum sections, the sections being of progressively decreasing diameter from the intake to the discharge, adjacent ends of adjacent sections having outwardly directed lapping flanges for internal step formation and section connection, longitudinally disposed exterior ribs disposed about the smaller sections adjacent the connecting flanges thereof for reenforcing same, the intake end having an inwardly directed aggregate trapping flange permitting aggregate supply and combustion gas discharge, each section having a plurality of annular series of arcuately spaced inwardly directed baffles, the baffle series of each section being longitudinally spaced apart, the baffle arcuate spacing in adjacent sections being offset angularly relative to each other, each baffle at its inner edge having an angularly directed longitudinally coextensive lip, the angularity being obtuse, and dam means associated with the smallest section baffles for forming therewith aggregate travel retarding pockets.

KENNETH A. RAYPHOLTZ.

REFERENCES CITED

The following references are of record in the file of this patent:

UNITED STATES PATENTS

| Number | Name | Date |
| --- | --- | --- |
| 914,052 | Kent | Mar. 2, 1909 |
| 1,056,121 | Prindle | Mar. 18, 1913 |
| 1,078,125 | Buttner | Nov. 11, 1913 |
| 1,240,480 | Park | Sept. 18, 1917 |
| 1,422,039 | Dean | July 4, 1922 |
| 1,598,542 | Smoot | Aug. 31, 1926 |
| 2,082,970 | Overman | June 8, 1937 |